(12) United States Patent
Singh et al.

(10) Patent No.: US 12,238,348 B2
(45) Date of Patent: Feb. 25, 2025

(54) SYSTEMS AND METHODS FOR WIRELESS REAL-TIME AUDIO AND VIDEO CAPTURE AT A LIVE EVENT

(71) Applicant: Mixhalo Corp., San Francisco, CA (US)

(72) Inventors: Vikram Singh, San Francisco, CA (US); Jeffrey Thomas Miller, San Diego, CA (US); Levi Weible, Los Angeles, CA (US); Tristan Andrews, Daly City, CA (US); Chang-Ning Tsai, Mountain View, CA (US)

(73) Assignee: Mixhalo Corp., San Francisco, CA (US)

( * ) Notice: Subject to any disclaimer, the term of this patent is extended or adjusted under 35 U.S.C. 154(b) by 0 days.

(21) Appl. No.: 18/219,792

(22) Filed: Jul. 10, 2023

(65) Prior Publication Data

US 2024/0021218 A1    Jan. 18, 2024

Related U.S. Application Data (60) Provisional application No. 63/389,219, filed on Jul. 14, 2022.

(51) Int. Cl.
| | |
|---|---|
| *H04N 21/2187* | (2011.01) |
| *G11B 27/031* | (2006.01) |
| *G11B 27/34* | (2006.01) |
| *H04N 21/2743* | (2011.01) |
| *H04N 21/422* | (2011.01) |

(52) U.S. Cl.
CPC ....... *H04N 21/2187* (2013.01); *G11B 27/031* (2013.01); *G11B 27/34* (2013.01); *H04N 21/2743* (2013.01); *H04N 21/42203* (2013.01)

(58) Field of Classification Search
CPC .......... H04N 21/2187; H04N 21/2743; H04N 21/42203; G11B 27/031; G11B 27/34
See application file for complete search history.

(56) References Cited

U.S. PATENT DOCUMENTS

| | | |
|---|---|---|
| 2013/0090054 A1 | 4/2013 | Bair |
| 2014/0192200 A1 | 7/2014 | Zagron |
| 2017/0109122 A1* | 4/2017 | Schmidt .................. H04L 65/75 |
| 2018/0158922 A1 | 6/2018 | Marck et al. |

(Continued)

FOREIGN PATENT DOCUMENTS

| | | |
|---|---|---|
| EP | 4 124 019 A1 | 1/2023 |
| WO | WO-2015/195390 A1 | 12/2015 |

(Continued)

*Primary Examiner* — Thai Q Tran
*Assistant Examiner* — Jose M Mesa
(74) *Attorney, Agent, or Firm* — Cesari and McKenna, LLP (57) ABSTRACT

A method for wireless capture of real-time audio and video at a live event using a mobile computing device includes receiving a data representation of a live audio signal corresponding to the live event via a wireless network. The method also includes processing the data representation of the live audio signal into a live audio stream. The method also includes initiating a video capture corresponding to the live event. The method also includes producing, concurrent with the video capture, a shareable video corresponding to the live event based on the captured video and the live audio stream.

20 Claims, 5 Drawing Sheets

(56) References Cited

U.S. PATENT DOCUMENTS

| | | |
|---|---|---|
| 2018/0329671 A1 | 11/2018 | Einziger et al. |
| 2019/0020905 A1* | 1/2019 | Bennett ................. H04N 5/917 |
| 2019/0363171 A1 | 11/2019 | Narck et al. |
| 2019/0373310 A1* | 12/2019 | Stojancic ........... H04N 21/4334 |
| 2020/0404214 A1 | 12/2020 | Leppanen |
| 2023/0020399 A1 | 1/2023 | Singh et al. |

FOREIGN PATENT DOCUMENTS

| | | |
|---|---|---|
| WO | WO-2021/028683 A1 | 2/2021 |
| WO | WO-2022/016147 A1 | 1/2022 |

* cited by examiner

SYSTEMS AND METHODS FOR WIRELESS REAL-TIME AUDIO AND VIDEO CAPTURE AT A LIVE EVENT

CROSS-REFERENCE TO RELATED APPLICATION

This application claims priority to and the benefit of U.S. Provisional Patent Application Ser. No. 63/389,219, filed Jul. 14, 2022, the entire disclosure of which is hereby incorporated by reference.

FIELD OF THE INVENTION

This invention relates generally to the field of real-time delivery of data, such as audio, over wireless networks. More specifically, the invention relates to systems and methods for integrating real-time live event audio with user captured video.

BACKGROUND

Mobile devices provide users the ability to share their experiences at live events with others. For example, users often upload and share video captured at live events using their mobile devices on social media platforms. However, the audio captured by a user's mobile device at live events is often limited by the quality of the microphone and hampered by ambient noise and the distance from the audio source. Therefore, there is a need for systems and methods that allow users at live events to use a mobile device to capture and share video with high quality audio.

SUMMARY

The present invention includes systems and methods for wireless capture of real-time audio and video at a live event using a mobile computing device. For example, the present invention includes systems and processes for receiving a data representation of a live audio signal corresponding to a live event via a wireless network and processing the data representation of the live audio signal into a live audio stream. The present invention also includes systems and processes for initiating a video capture by a mobile computing device at a live event and producing a shareable video in real-time based on the captured video and a live audio signal corresponding to the live event.

The present invention also includes systems and methods for wireless capture of real-time audio and video at a live event using a mobile computing device and timestamp data. For example, the present invention includes systems and processes for initiating and locally storing a video capture corresponding to a live event at a first time and an audio capture by one or more microphones of the mobile computing device at the first time. The present invention also includes systems and processes for receiving an audio segment corresponding to the live event at a second time based on an adjusted timestamp and a duration of the audio capture and producing a shareable video corresponding to the live event based on the captured video and the received audio segment.

In one aspect, the invention includes a computerized method for wireless capture of real-time audio and video at a live event using a mobile computing device. The computerized method includes receiving, by a mobile computing device at a live event, a data representation of a live audio signal corresponding to the live event via a wireless network. The computerized method also includes processing, by the mobile computing device at the live event, the data representation of the live audio signal into a live audio stream.

The computerized method also includes initiating, by the mobile computing device at the live event, a video capture corresponding to the live event. The computerized method also includes, concurrent with the video capture, producing, by the mobile computing device at the live event, a shareable video corresponding to the live event based on the captured video and the live audio stream.

In some embodiments, the computerized method further includes uploading the produced shareable video to a social network. In some embodiments, the computerized method further includes receiving the data representation of the live audio signal corresponding to the live event from an audio server computing device via the wireless network.

In some embodiments, video capture includes ambient audio captured by one or more microphones of the mobile computing device. For example, in some embodiments, the produced shareable video includes the ambient audio from the video capture. In some embodiments, an audio mix including the live audio stream and the ambient audio is configurable by a user of the mobile computing device.

In some embodiments, the video capture includes a first video feed from a rear-facing camera of the mobile computing device and a second video feed from a front-facing camera of the mobile computing device. For example, in some embodiments, the produced shareable video includes video from the first video feed and the second video feed.

In another aspect, the invention includes a mobile computing device for wireless capture of real-time audio and video at a live event. The mobile computing device is configured to receive a data representation of a live audio signal corresponding to the live event via a wireless network. The mobile computing device is also configured to process the data representation of the live audio signal into a live audio stream. The mobile computing device is also configured to initiate a video capture corresponding to the live event. The mobile computing device is also configured to, concurrent with the video capture, produce a shareable video corresponding to the live event based on the captured video and the live audio stream.

In some embodiments, the mobile computing device is further configured to upload the produced shareable video to a social network. In some embodiments, the mobile computing device is configured to receive the data representation of the live audio signal corresponding to the live event from an audio server computing device via the wireless network.

In some embodiments, video capture includes ambient audio captured by one or more microphones of the mobile computing device. For example, in some embodiments, the produced shareable video includes the ambient audio from the video capture. In some embodiments, an audio mix including the live audio stream and the ambient audio is configurable by a user of the mobile computing device.

In some embodiments, the video capture includes a first video feed from a rear-facing camera of the mobile computing device and a second video feed from a front-facing camera of the mobile computing device. For example, in some embodiments, the produced shareable video includes video from the first video feed and the second video feed.

In another aspect, the invention includes a system for wireless capture of real-time audio and video at a live event using a mobile computing device. The system includes a mobile computing device communicatively coupled to an audio server computing device over a wireless network. The mobile computing device is configured to receive a data representation of a live audio signal corresponding to a live event via the wireless network. The mobile computing device is also configured to process the data representation of the live audio signal into a live audio stream. The mobile computing device is also configured to initiate a video capture corresponding to the live event. The mobile computing device is also configured to, concurrent with the video capture, produce a shareable video corresponding to the live event based on the captured video and the live audio stream.

In some embodiments, the mobile computing device is further configured to upload the produced shareable video to a social network. In some embodiments, the mobile computing device is configured to receive the data representation of the live audio signal corresponding to the live event from the audio server computing device via the wireless network.

In some embodiments, video capture includes ambient audio captured by one or more microphones of the mobile computing device. For example, in some embodiments, the produced shareable video includes the ambient audio from the video capture. In some embodiments, an audio mix including the live audio stream and the ambient audio is configurable by a user of the mobile computing device.

In some embodiments, the video capture includes a first video feed from a rear-facing camera of the mobile computing device and a second video feed from a front-facing camera of the mobile computing device. For example, in some embodiments, the produced shareable video includes video from the first video feed and the second video feed.

In another aspect, the invention includes a computerized method for wireless capture of real-time audio and video at a live event using a mobile computing device. The computerized method includes receiving, by a mobile computing device at a live event, a data representation of a live audio signal corresponding to the live event via a wireless network. The computerized method also includes processing, by the mobile computing device at the live event, the data representation of the live audio signal into a live audio stream. The computerized method also includes initiating, by the mobile computing device at the live event, a first video capture from a rear-facing camera of the mobile computing device corresponding to the live event.

The computerized method also includes initiating, by the mobile computing device at the live event, a second video capture from a front-facing camera of the mobile computing device corresponding to the live event. The computerized method also includes initiating, by the mobile computing device at the live event, an ambient audio recording from a microphone of the mobile computing device corresponding to the live event. The computerized method also includes producing, by the mobile computing device at the live event, a shareable video corresponding to the live event based on the first and second captured videos, the live audio stream, and the ambient audio.

In some embodiments, the computerized method further includes uploading the produced shareable video to a social network. In some embodiments, the computerized method further includes receiving the data representation of the live audio signal corresponding to the live event from an audio server computing device via the wireless network.

In another aspect, the invention includes a computerized method for wireless capture of real-time audio and video at a live event using a mobile computing device. The computerized method includes initiating, by a mobile computing device, a video capture corresponding to a live event at a first time. The computerized method also includes initiating, by the mobile computing device, an audio capture by one or more microphones of the mobile computing device at the first time. The computerized method also includes locally storing, by the mobile computing device, the video capture and the audio capture, both including a timestamp and a duration.

The computerized method also includes transmitting, by the mobile computing device, the timestamp and the duration to a server computing device via a wireless network. The computerized method also includes receiving, by the mobile computing device, an audio segment corresponding to the live event at a second time based on an adjusted timestamp and the duration. The adjusted timestamp is calculated based on the timestamp and the audio capture. The computerized method also includes producing, by the mobile computing device, a shareable video corresponding to the live event based on the captured video and the audio segment.

In some embodiments, the adjusted timestamp is further based on an audio travel time between a speaker device at the live event and the one or more microphones of the mobile computing device. For example, in some embodiments, the computerized method also includes calculating, by the mobile computing device, the adjusted timestamp based on the timestamp and the audio capture. In other embodiments, the computerized method also includes transmitting, by the mobile computing device, the audio capture to the server computing device via the wireless network. For example, in some embodiments, the adjusted timestamp is calculated by the server computing device.

In some embodiments, the computerized method also includes uploading, by the mobile computing device, the produced shareable video to a social network. In some embodiments, the video capture includes a first video feed from a rear-facing camera of the mobile computing device and a second video feed from a front-facing camera of the mobile computing device. For example, in some embodiments the produced shareable video includes video from the first video feed and the second video feed.

In another aspect, the invention includes a mobile computing device for wireless capture of real-time audio and video at a live event. The mobile computing device is configured to initiate a video capture corresponding to a live event at a first time. The mobile computing device is also configured to initiate an audio capture by one or more microphones of the mobile computing device at the first time. The mobile computing device is also configured to locally store the video capture and the audio capture, both including a timestamp and a duration.

The mobile computing device is also configured to transmit the timestamp and the duration to a server computing device via a wireless network. The mobile computing device is also configured to receive an audio segment corresponding to the live event at a second time based on an adjusted timestamp and the duration. The adjusted timestamp is calculated based on the timestamp and the audio capture. The mobile computing device is also configured to produce a shareable video corresponding to the live event based on the captured video and the audio segment.

In some embodiments, the adjusted timestamp is further based on an audio travel time between a speaker device at the live event and the one or more microphones of the mobile computing device. For example, in some embodiments, the mobile computing device is also configured to calculate the adjusted timestamp based on the timestamp and the audio capture. In other embodiments, the mobile computing device is also configured to transmit the audio capture to the server computing device via the wireless network. For example, in some embodiments, the adjusted timestamp is calculated by the server computing device.

In some embodiments, the mobile computing device is also configured to upload the produced shareable video to a social network. In some embodiments, the video capture includes a first video feed from a rear-facing camera of the mobile computing device and a second video feed from a front-facing camera of the mobile computing device. For example, in some embodiments, the produced shareable video includes video from the first video feed and the second video feed.

In another aspect, the invention includes a system for wireless capture of real-time audio and video at a live event using a mobile computing device. The system includes a mobile computing device communicatively coupled to a server computing device over a wireless network. The mobile computing device is configured to initiate a video capture corresponding to a live event at a first time. The mobile computing device is also configured to initiate an audio capture by one or more microphones of the mobile computing device at the first time. The mobile computing device is also configured to locally store the video capture and the audio capture, both including a timestamp and a duration.

The mobile computing device is also configured to transmit the timestamp and the duration to the server computing device via the wireless network. The mobile computing device is also configured to receive an audio segment corresponding to the live event at a second time based on an adjusted timestamp and the duration. The adjusted timestamp is calculated based on the timestamp and the audio capture. The mobile computing device is also configured to produce a shareable video corresponding to the live event based on the captured video and the audio segment.

In some embodiments, the adjusted timestamp is further based on an audio travel time between a speaker device at the live event and the one or more microphones of the mobile computing device. For example, in some embodiments, the mobile computing device is also configured to calculate the adjusted timestamp based on the timestamp and the audio capture. In other embodiments, the mobile computing device is also configured to transmit the audio capture to the server computing device via the wireless network. For example, in some embodiments, the server computing device is configured to calculate the adjusted timestamp based on at least the timestamp and the audio capture.

In some embodiments, the mobile computing device is also configured to upload the produced shareable video to a social network. In some embodiments, the video capture includes a first video feed from a rear-facing camera of the mobile computing device and a second video feed from a front-facing camera of the mobile computing device. For example, in some embodiments, the produced shareable video includes video from the first video feed and the second video feed.

These and other aspects of the invention will be more readily understood from the following descriptions of the invention, when taken in conjunction with the accompanying drawings and claims.

DETAILED DESCRIPTION

Figure 1:
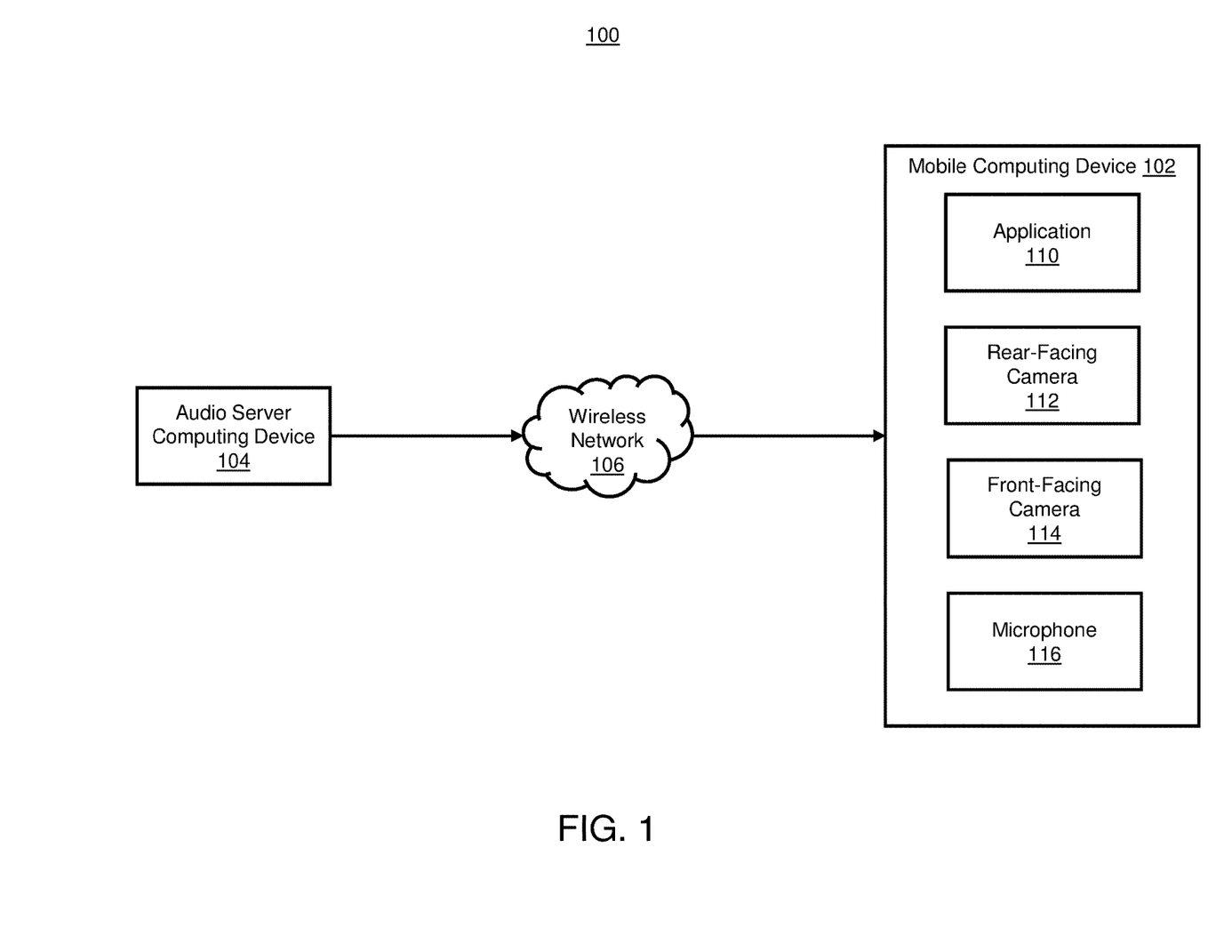
FIG. 1 is a schematic diagram of a system architecture for wireless capture of real-time audio and video at a live event using a mobile computing device, according to an illustrative embodiment of the invention.

FIG. 1 is a schematic diagram of a system architecture 100 for wireless capture of real-time audio and video at a live event using a mobile computing device, according to an illustrative embodiment of the invention. System 100 includes a mobile computing device 102 communicatively coupled to an audio server computing device 104 over a wireless network 106. Mobile computing device 102 includes an application 110, a rear-facing camera 112, a front-facing camera 114, and a microphone 116. In some embodiments, the audio server computing device 104 is communicatively coupled to an audio interface (not shown).

Exemplary mobile computing devices 102 include, but are not limited to, tablets and smartphones, such as Apple® iPhone®, iPad® and other iOS®-based devices, and Samsung® Galaxy®, Galaxy Tab™ and other Android™-based devices. It should be appreciated that other types of computing devices capable of connecting to and/or interacting with the components of system 100 can be used without departing from the scope of invention. Although FIG. 1 depicts a single mobile computing device 102, it should be appreciated that system 100 can include a plurality of client computing devices.

Mobile computing device 102 is configured to receive instructions from application 110 in order to wirelessly capture real-time audio and video at a live event. For example, mobile computing device 102 is configured to receive a data representation of a live audio signal corresponding to the live event via wireless network 106. In some embodiments, the mobile computing device 102 receives the data representation of the live audio signal from the audio server computing device 104, which in turn is coupled to an audio source at the live event (e.g., a soundboard that is capturing the live audio). Mobile computing device 102 is also configured to process the data representation of the live audio signal into a live audio stream. Mobile computing device 102 is also configured to initiate a video capture corresponding to the live event. In some embodiments, a user attending the live event initiates the video capture using application 110. An exemplary application 110 can be an app downloaded to and installed on the mobile computing device 102 via, e.g., the Apple® App Store or the Google® Play Store. The user can launch application 110 on the mobile computing device 102 and interact with one or more user interface elements displayed by the application 110 on a screen of the mobile computing device 102 to initiate the video capture.

Mobile computing device 102 is also configured to produce a shareable video corresponding to the live event based on the captured video and the live audio stream. Generally, the produced shareable video comprises high quality audio from the live audio stream alongside video captured by and from the perspective of a user attending the live event. In some embodiments, the mobile computing device 102 is configured to produce the shareable video concurrent with the video capture. For example, during video capture, the mobile computing device 102 can integrate the live audio stream corresponding to the live event with the captured video corresponding to the live event to produce the shareable video.

In some embodiments, the mobile computing device 102 is further configured to upload the produced shareable video to a social network. For example, the mobile computing device 102 can be configured to transmit the produced shareable video via the wireless network 106 to a server computing device associated with the social network (not shown). Exemplary social networks include, but are not limited to, Facebook®, Instagram®, TikTok®, and YouTube®. In some embodiments, the mobile computing device 102 is configured to receive the data representation of the live audio signal corresponding to the live event from the audio server computing device 104 via the wireless network 106.

In some embodiments, video capture includes ambient audio captured by one or more microphones 116 of the mobile computing device. As an example, the ambient audio can comprise audio that corresponds to the live audio stream (i.e., audio relating to one or more performers at the live event, such as musicians on stage), but is being emitted by loudspeakers and captured by microphones 116 of the mobile computing device. The ambient audio captured by microphones 116 can also include audio from various sources in proximity to the mobile computing device 102, such as audience members, announcers, and other sources in the surrounding environment. In some embodiments, the produced shareable video includes the ambient audio from the video capture. In some embodiments, an audio mix including the live audio stream and the ambient audio is configurable by a user of the mobile computing device 102 via application 110. In some embodiments, each of the live audio stream and the ambient audio is received by application 110 as a separate channel, and a user of the mobile computing device 102 can adjust a relative volume of each channel to produce an audio mix that comprises both the live audio stream and the ambient audio according to the relative volume settings. For example, the application 110 can display a slider or knob to the user, with an indicator set to a middle position (indicating an equally balanced mix between the live audio stream and the ambient audio). When the user adjusts the indicator in one direction (e.g., left), the application 110 can increase the relative volume of the live audio stream and reduce the relative volume of the ambient audio. Similarly, when the user adjust the indicator in the other direction (e.g., right), the application 110 can increase the relative volume of the ambient audio and decrease the relative volume of the live audio stream.

In some embodiments, the video capture includes a first video feed from a rear-facing camera 112 of the mobile computing device 102 and a second video feed from a front-facing camera 114 of the mobile computing device 102. For example, in some embodiments, the produced shareable video includes video from the first video feed and the second video feed. In one example, the user can hold the mobile computing device 102 such that the field of view of the rear-facing camera 112 is pointing toward the live event (e.g., at the performers on stage) while the field of view of the front-facing camera 114 is pointing toward the user (e.g., to capture the user's reaction to the performance). In some embodiments, each of these video feeds is captured by the mobile computing device 102 as a separate video file or stream. In some embodiments, the mobile computing device 102 combines the first video feed and the second video feed into a combined video capture—for example, the second video feed from the front-facing camera can be overlaid in a portion (e.g., a corner) of the first video feed from the rear-facing camera so that each of the video feeds can be seen concurrently.

In some configurations, system 100 includes a headphone (not shown) communicatively coupled to the mobile computing device 102. The headphone may include a microphone (in addition to microphone 116). For example, in some embodiments, the mobile computing device 102 is configured to capture ambient audio using the headphone's microphone. In some embodiments, the mobile computing device 102 is configured to capture ambient audio using the headphone's microphone in response to the user initiating a camera flip using the application 110.

Audio server 104 is a computing device comprising specialized hardware and/or software modules that execute on one or more processors and interact with memory modules of the audio server computing device, to receive data from other components of the system 100, transmit data to other components of the system 100, and perform functions relating to wireless capture of real-time audio and video at a live event using a mobile computing device as described herein. In some embodiments, audio server computing device 104 is configured to receive a live audio signal from an audio source at the live event (e.g., a soundboard that is capturing the live audio) and transmit a data representation of the live audio signal via network 106 to one or more mobile computing devices 102.

In some embodiments, audio server computing device 104 can pre-process the live audio signal when generating the data representation of the live audio signal prior to transmission to mobile computing devices. For example, the audio server computing device 104 can generate one or more data packets corresponding to the live audio signal. In some embodiments, creating a data representation of the live audio signal includes using one of the following compression codecs: AAC, HE-AAC MP3, MPE VBR, Apple Lossless, IMA4, IMA ADPCM, or Opus.

Wireless network 106 is configured to communicate electronically with network hardware of the audio server computing device 104 and to transmit the data representation of the live audio signal to the mobile computing device 102. In some embodiments, the network 104 can support one or more routing schemes, e.g., unicast, multicast and/or broadcast.

Additional detail regarding illustrative technical features of the methods and systems described herein are found in U.S. Pat. No. 11,461,070, titled "Systems and Methods for Providing Real-Time Audio and Data" and issued Oct. 24, 2022, and U.S. Pat. No. 11,625,213, titled "Systems and Methods for Providing Real-Time Audio and Data," and issued Apr. 11, 2023, the entirety of each of which is incorporated herein by reference.

As can be appreciated, the methods and systems described herein are configured to integrate high-quality live event audio with user-captured video. In some embodiments, the integration is performed by the mobile computing device 102, which receives the high-quality live event audio from audio server computing device 104 and combines the live event audio with video captured by one or more cameras 114, 116 of the mobile computing device 102 (as described with respect to FIGS. 2 and 3 below). In some embodiments, the integration is performed by the audio server computing device 104, which receives the captured video from the mobile computing device and combines the captured video with the live event audio using one or more timestamps (as described with respect to FIGS. 4 and 5 below).

Figure 2:
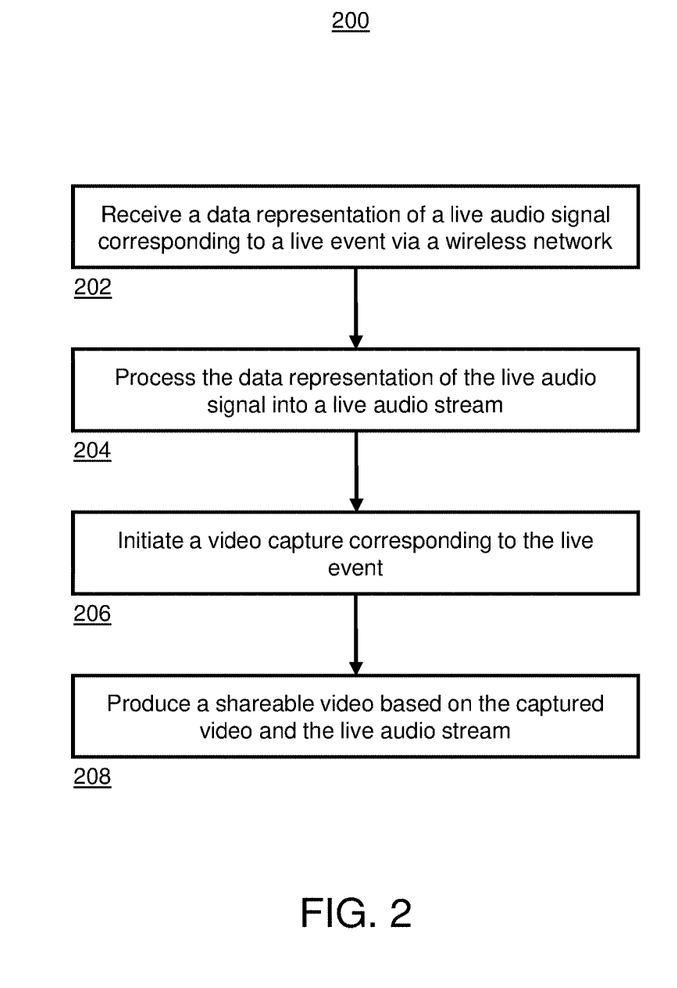
FIG. 2 is a schematic flow diagram illustrating wireless capture of real-time audio and video at a live event using a mobile computing device, according to an illustrative embodiment of the invention.

FIG. 2 is a schematic flow diagram of a process 200 for wireless capture of real-time audio and video at a live event using a mobile computing device 102, according to an illustrative embodiment of the invention. Process 200 begins by receiving, by a mobile computing device 102 at a live event, a data representation of a live audio signal corresponding to the live event via a wireless network 106 at step 202. For example, in some embodiments, the mobile computing device 102 is configured to receive the data representation of the live audio signal corresponding to the live event from an audio server computing device 104 via the wireless network 106.

Process 200 continues by processing, by the mobile computing device 102 at the live event, the data representation of the live audio signal into a live audio stream at step 204. Process 200 continues by initiating, by the mobile computing device 102 at the live event, a video capture corresponding to the live event at step 206. Process 200 finishes by, concurrently with the video capture, producing, by the mobile computing device 102 at the live event, a shareable video corresponding to the live event based on the captured video and the live audio stream at step 208. In some embodiments, the process used to produce the shareable video can depend upon the type of operating system installed on the mobile computing device 102. As just one example, the mobile computing device 102 can include the Apple® iOS® operating system. To produce the shareable video on iOS, the application 110 on mobile computing device 102 captures data stored in the video buffer from the device's camera and captures data from the audio buffer from the audio engine provided in application 110. The application 110 writes the two buffers to a single local file on the mobile computing device 102 in real time as the data from the buffers is captured. In some embodiments, data from the two buffers are not spliced together afterwards; instead, in these embodiments the data are captured simultaneously and spliced together as the buffers are captured. Producing the shareable video on other operating systems (such as Android™-based operating systems) can comprise a similar process, i.e., combining audio and video for each frame in real time. In some embodiments, the application 110 captures video from the camera and inserts a watermark into the video frame, then multiplexes (or mixes) the watermarked video with the incoming audio. As can be appreciated, producing the shareable video in this manner can support real-time streaming of the shareable video to, e.g., one or more social media platforms. In some embodiments, process 200 continues by uploading the produced shareable video to a social network.

Generally, the quality of the captured video and captured audio can comprise any of a number of different quality levels, bitrates, and/or resolutions. For example, certain social networks or social media platforms may impose limits on the file size and/or quality of uploaded video content. The application 110 can adjust the video and/or audio quality settings to accommodate the requirements of one or more of these social media services. In some embodiments, the video data is captured in 1080p resolution and the audio data is captured using a bitrate of 320 Kbps.

In some embodiments, the video capture includes ambient audio captured by one or more microphones 116 of the mobile computing device 102. For example, in some embodiments, the produced shareable video includes the ambient audio from the video capture. In some embodiments, an audio mix including the live audio stream and the ambient audio is configurable by a user of the mobile computing device 102.

In some embodiments, the video capture includes a first video feed from a rear-facing camera 112 of the mobile computing device 102 and a second video feed from a front-facing camera 114 of the mobile computing device 102. For example, in some embodiments, the produced shareable video includes video from the first video feed and the second video feed.

Figure 3:
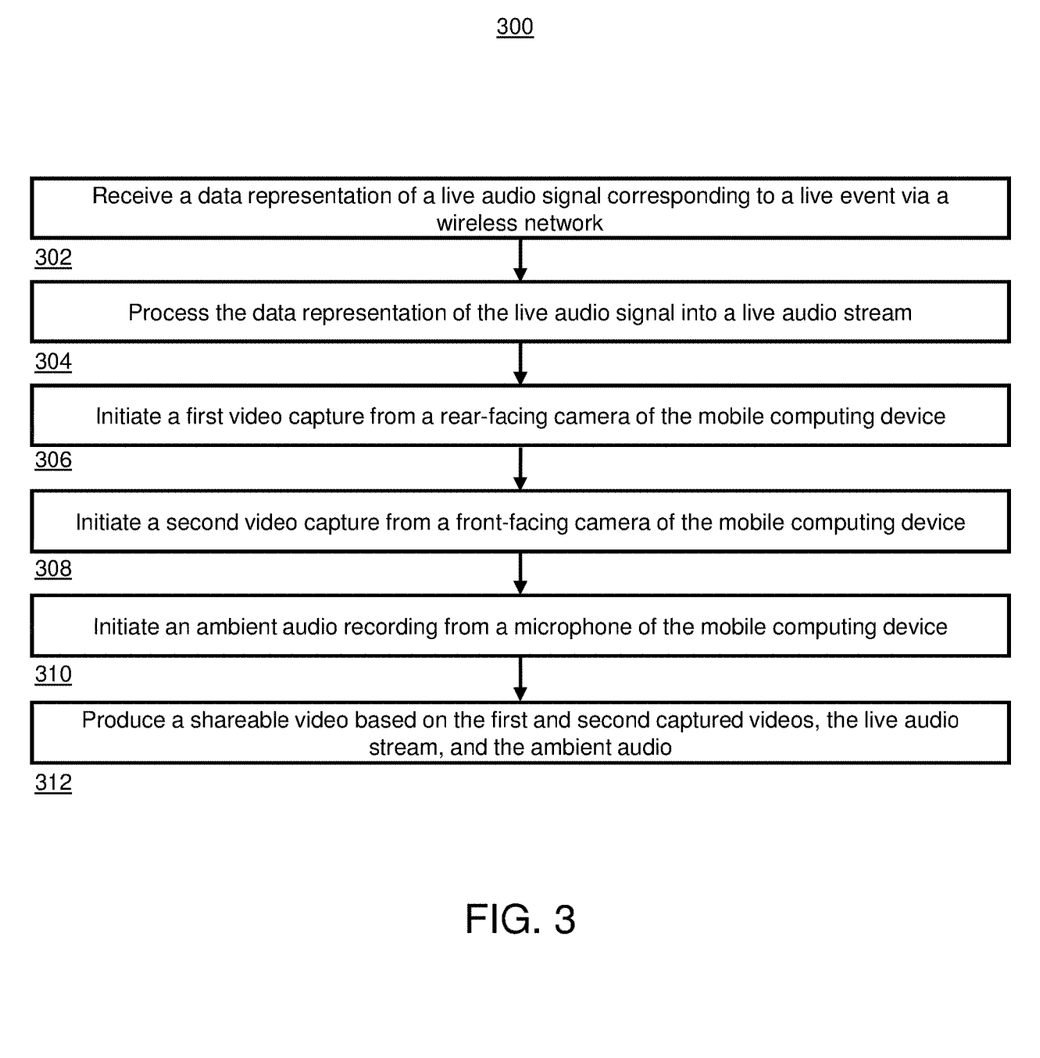
FIG. 3 is a schematic flow diagram illustrating wireless capture of real-time audio and video at a live event using a rear-facing camera, a front-facing camera, and a microphone of a mobile computing device, according to an illustrative embodiment of the invention.

FIG. 3 is a schematic flow diagram of a process 300 for wireless capture of real-time audio and video at a live event using a rear-facing camera 112, a front-facing camera 114, and a microphone 116 of a mobile computing device 102, according to an illustrative embodiment of the invention. Process 300 begins by receiving a data representation of a live audio signal corresponding to the live event via a wireless network 106 at step 302. Process 300 continues by processing the data representation of the live audio signal into a live audio stream at step 304. Process 300 continues by initiating a first video capture from a rear-facing camera 112 of the mobile computing device 102 at step 306. Process 300 continues by initiating a second video capture from a front-facing camera 114 of the mobile computing device 102 at step 308. Process 300 continues by initiating an ambient audio recording from a microphone 116 of the mobile computing device 102 at step 310. Process 312 finishes by producing a shareable video based on the first and second captured videos, the live audio stream, and the ambient audio at step 312.

Process 300 can be implemented using a system 100 for wireless capture of real-time audio and video at a live event. For example, system 100 can include a mobile computing device 102 communicatively coupled to an audio server computing device 104 over a wireless network 106. The mobile computing device 102 can include a rear-facing camera 112, a front-facing camera 114, and a microphone 116. The mobile computing device 102 can be configured to receive a data representation of a live audio signal corresponding to a live event via the wireless network 106. The mobile computing device 102 can also be configured to process the data representation of the live audio signal into a live audio stream.

Further, the mobile computing device 102 can be configured to initiate a first video capture from the rear-facing camera 112 of the mobile computing device 102 and a second video capture from the front-facing camera 114 of the mobile computing device 102. The mobile computing device 102 can also be configured to initiate an ambient recording from the microphone 116 of the mobile computing device 102. The mobile computing device 102 can also be configured to produce a shareable video based on the first and second captured videos, the live audio stream, and the ambient audio. The produced shareable video will have high quality audio from the live audio stream alongside video captured by and from the perspective of a user attending the live event. For example, in some embodiments, the mobile computing device 102 is further configured to upload the produced shareable video to a social network.

Figure 4:
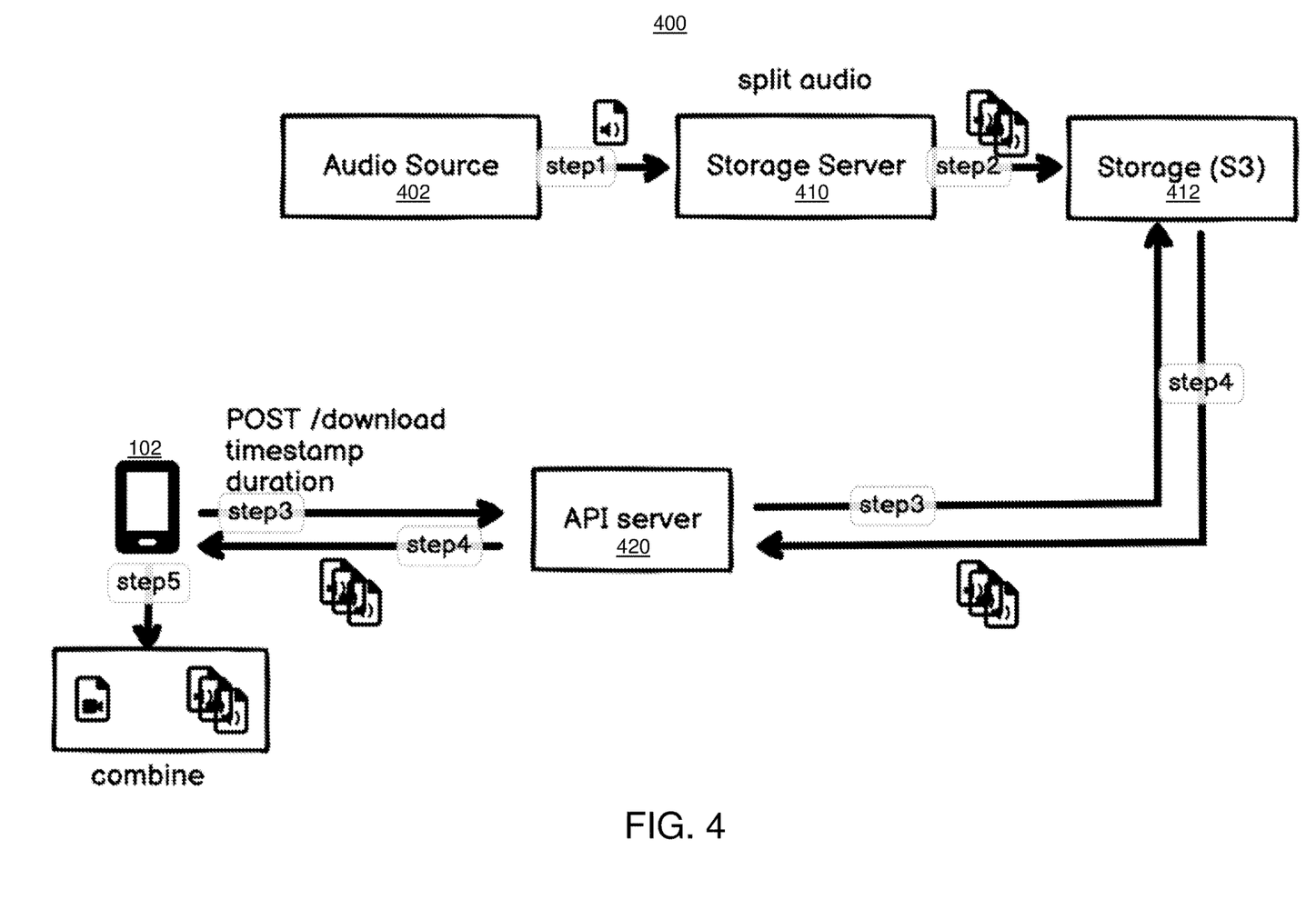
FIG. 4 is a schematic diagram of a system architecture for wireless capture of real-time audio and video at a live event using a mobile computing device and timestamp data, according to an illustrative embodiment of the invention.

FIG. 4 is a schematic diagram of a system architecture 400 for wireless capture of real-time audio and video at a live event using a mobile computing device 102 and timestamp data, according to an illustrative embodiment of the invention. System 400 includes a mobile computing device 102 communicatively coupled to an application programming interface (API) server computing device 420 over a wireless network. For example, in some embodiments, API server 420 is communicatively coupled to mobile computing device 420 via an API, where the mobile computing device initiates one or more API calls to server 420 to retrieve data from storage 412. System 400 also includes an audio source 402 communicatively coupled to a storage server 410. An exemplary audio source 402 is a soundboard that receives one or more input signals (e.g., from microphones or instruments on stage) and mixes them into a live audio signal. Storage server 410 is a computing device comprising specialized hardware and/or software modules that execute on one or more processors and interact with memory modules of the storage server 410, to receive a live audio signal from audio source 402 and prepare the live audio signal for transmission to storage 412. In some embodiments, the audio source 402 is communicatively coupled to the storage server 410 via an audio interface. At step 1, storage server 410 is configured to receive audio data from audio source 402 corresponding to a live event, At step 2, storage server 410 stores the audio data in storage 412 (step 2). In some embodiments, storage 412 is a cloud-based object storage service, such as Amazon Simple Storage Service (S3) available from Amazon Web Services, Inc. In some embodiments, the server computing device 420 is communicatively coupled to storage server 410 and storage 412 via a wireless network.

The mobile computing device 102 is configured to initiate a video capture corresponding to the live event at a first time. The mobile computing device 102 is also configured to initiate an audio capture by one or more microphones of the mobile computing device at the first time. The mobile computing device 102 is also configured to locally store the video capture and the audio capture, both including a timestamp and a duration.

It should be appreciated that, in some embodiments, the mobile computing device 102 (and/or the application 110 on mobile computing device) and the storage server 410 are synchronized to the same time—using, e.g., a time server such as a Network Time Protocol (NTP) server. For example, each of the mobile computing device 102 and the storage server 410 can be configured to connect to a time server for the purpose of receiving a time clock value for setting, e.g., system clocks and/or timestamp values used in the process of FIG. 4.

At step 3, the mobile computing device 102 is configured to transmit the timestamp and the duration to the API server 420 via the wireless network, and API server 420 requests an audio segment corresponding to the live event from storage 412 based upon the timestamp and duration. As an example, the mobile computing device 102 can transmit to the API server 420 a timestamp associated with a start of the video capture and a value indicating a duration (e.g., in seconds) of the video capture. API server 420 relays the timestamp and duration to storage 412, which identifies the stored audio source file, extracts the requested segment using the timestamp and duration, and serves the extracted file back to API server 420 for transmission to the mobile computing device 102. In some embodiments, storage 412 adds a small amount (e.g., seconds or milliseconds) of additional audio from prior to the timestamp and/or after the duration value to the extracted file as a buffer.

At step 4, storage 412 transmits the requested audio segment to API server 420, which forwards the audio segment to mobile computing device 102. The adjusted timestamp is calculated based on the timestamp and the audio capture. In some embodiments, the adjusted timestamp is calculated by the mobile computing device 102. In other embodiments, the adjusted timestamp is calculated by the storage 412 and/or storage server 410.

One example of calculating the adjusted timestamp is based upon time delay estimation (TDE) using a cross-correlation (CC) formula. Input parameters for the TDE (which uses a CC formula) may include:

Cycle: A cycle consists of a length of a stream recording and mic recording from a computing device (e.g., a mobile device) mic or headphone mic. The length of the cycle is defined by the variables below.

Analysis Window Size: The size (e.g., in milliseconds) of the window where the two clips are compared. This window size may be set variably.

Analysis Step Size: The length (e.g., in milliseconds) the analysis window is advanced after an iteration of analysis done by the CC formula. The Step Size may be set variably.

Steps per Cycle: The number of steps of Step Size length that the real time audio streaming platform's TDE will consider when estimating the delay between the two audio clips in the present Cycle. The Steps per Cycle may be set variably.

Partial Steps: The act of breaking the Steps per Cycle analysis into smaller chunks to decrease redundant calculations.

Max Delay: The maximum distance (e.g., in milliseconds) the two samples could be offset from each other. The Max Delay may be set variably.

Min Delay: The minimum distance (e.g., in milliseconds) the two samples could be offset from each other. The Min Delay may be set variably.

Interval: Used to determine how frequently the TDE process runs. The Interval parameter is used to reduce impact on the device.

In some implementations, the time complexity of the cross-correlation may be related linearly to two input variables: max delay and analysis window.

$$O(n)=O(\text{max delay}*\text{analysis window})=O(mw)$$

The CC function also may be repeated for each analysis step in the sample.

$$O(n)=(mw)*O(\text{cycle length}/\text{analysis step})=O(mwL/s)$$

In some embodiments, an audio sample from the storage server 410 and an audio sample captured by one or more microphones of the mobile computing device 102 are analyzed. The analysis includes defining an Analysis Window. In some implementations, the Analysis Step Size is then set to half the Analysis Window for each iteration. On each iteration, the Analysis Window is passed to the CC formula which produces a delay estimate value. This delay value can be bounded by the Max Delay variable in order to increase the speed of the CC formula (which is done by bounding how many calculations need to be done per Step Size). The Window is then advanced by the length specified by the analysis Step Size (e.g., half of the analysis window) in the next iteration and the delay is calculated again. This process continues until Cycle or Sample has been completely analyzed. Additional detail regarding the performance of dynamic latency estimation and calculation of adjusted timestamps using cross-correlation is described in U.S. patent application Ser. No. 17/864,720, titled "Dynamic Latency Estimation for Audio Streams," filed on Jul. 14, 2022, the entirety of which is incorporated herein by reference.

At step 5, the mobile computing device 102 combines the captured video and the audio segment received from API server 420 to produce a shareable video corresponding to the live event.

In some embodiments, the adjusted timestamp is further based on an audio travel time between a speaker device at the live event and the one or more microphones 116 of the mobile computing device 102. For example, in some embodiments, the mobile computing device 102 is also configured to calculate the adjusted timestamp based on the timestamp and the audio capture. In other embodiments, the mobile computing device 102 is also configured to transmit the audio capture to the server computing device 420 via the wireless network. For example, in some embodiments, the server computing device 420 is configured to calculate the adjusted timestamp based on at least the timestamp and the audio capture.

In some embodiments, the mobile computing device 102 is also configured to upload the produced shareable video to a social network. In some embodiments, the video capture includes a first video feed from a rear-facing camera 112 of the mobile computing device and a second video feed from a front-facing camera 114 of the mobile computing device. For example, in some embodiments, the produced shareable video includes video from the first video feed and the second video feed.

Figure 5:
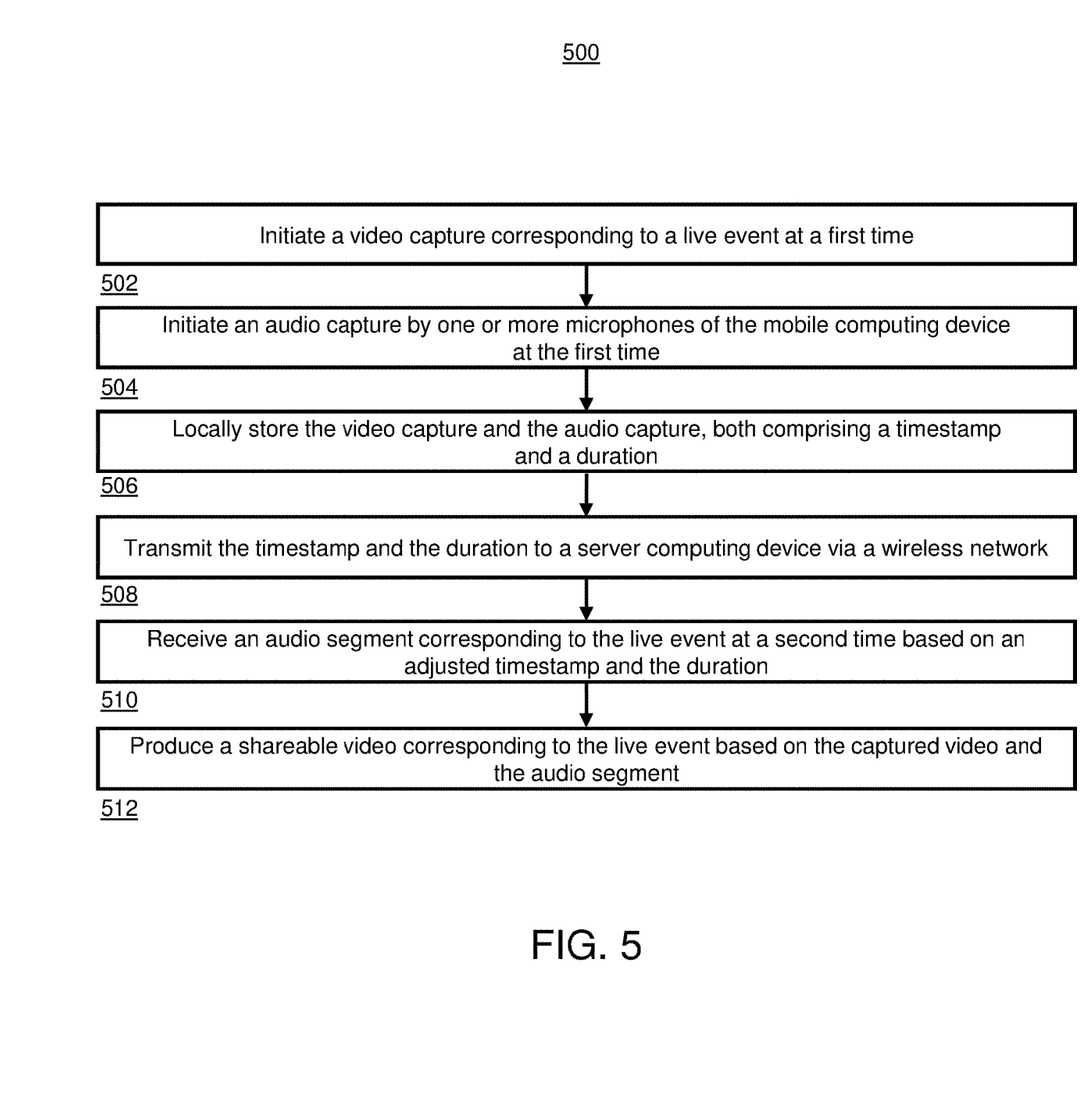
FIG. 5 is a schematic flow diagram illustrating wireless capture of real-time audio and video at a live event using a mobile computing device and timestamp data, according to an illustrative embodiment of the invention.

FIG. 5 is a schematic flow diagram illustrating a process 500 for wireless capture of real-time audio and video at a live event using system architecture 400 and timestamp data, according to an illustrative embodiment of the invention. Process 500 begins by initiating, by a mobile computing device 102, a video capture corresponding to a live event at a first time at step 502. Process 500 continues by initiating, by the mobile computing device 102, an audio capture by one or more microphones 116 of the mobile computing device 102 at the first time at step 504. Process 500 continues by locally storing, by the mobile computing device 102, the video capture and the audio capture, both including a timestamp and a duration at step 506.

Process 500 continues by transmitting, by the mobile computing device 102, the timestamp and the duration to a server computing device 420 via a wireless network 106 at step 508. Process 500 continues by receiving, by the mobile computing device 102, an audio segment corresponding to the live event at a second time based on an adjusted timestamp and the duration at step 510. The adjusted timestamp is calculated based on the timestamp and the audio capture. In some embodiments, the adjusted timestamp is further based on an audio travel time between a speaker device at the live event and the one or more microphones 116 of the mobile computing device 102. For example, in some embodiments, process 500 also includes calculating, by the mobile computing device 102, the adjusted timestamp based on the timestamp and the audio capture. In other embodiments, process 500 includes transmitting, by the mobile computing device 102, the audio capture to the server computing device 420 via the wireless network 106. For example, in some embodiments, the adjusted timestamp is calculated by the server computing device 420.

Process 500 finished by producing, by the mobile computing device 102, a shareable video corresponding to the live event based on the captured video and the audio segment at step 512. In some embodiments, process 500 includes uploading, by the mobile computing device 102, the produced shareable video to a social network. In some embodiments, the video capture includes a first video feed from a rear-facing camera 112 of the mobile computing device 102 and a second video feed from a front-facing camera 114 of the mobile computing device 102. For example, in some embodiments the produced shareable video includes video from the first video feed and the second video feed.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices;

magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Edge™ available from Microsoft Corporation, and/or Mozilla® Firefox available from Mozilla Corporation). Mobile computing device include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The systems and methods described herein can be implemented using supervised learning and/or machine learning algorithms. Supervised learning is the machine learning task of learning a function that maps an input to an output based on example of input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts While the invention has been particularly shown and described with reference to specific preferred embodiments, it should be understood by those skilled in the art that various changes in form and detail may be made therein without departing from the spirit and scope of the invention as defined by the following claims.

The invention claimed is:

1. A computerized method for wireless capture of real-time audio and video at a live event using a mobile computing device, the method comprising:

initiating, by a mobile computing device, a video capture corresponding to a live event at a first time;

initiating, by the mobile computing device, an audio capture by one or more microphones of the mobile computing device at the first time;

locally storing, by the mobile computing device, the video capture and the audio capture, both comprising a timestamp and a duration;

transmitting, by the mobile computing device, the timestamp and the duration to a server computing device via a wireless network;

receiving, by the mobile computing device, an audio segment corresponding to the live event at a second time based on an adjusted timestamp and the duration, wherein the adjusted timestamp is calculated based on the timestamp and the audio capture; and producing, by the mobile computing device, a shareable video corresponding to the live event based on the captured video and the audio segment.

2. The computerized method of claim 1, wherein the adjusted timestamp is further based on an audio travel time between a speaker device at the live event and the one or more microphones of the mobile computing device.

3. The computerized method of claim 1, further comprising:
calculating, by the mobile computing device, the adjusted timestamp based on the timestamp and the audio capture.

4. The computerized method of claim 1, further comprising:
transmitting, by the mobile computing device, the audio capture to the server computing device via the wireless network.

5. The computerized method of claim 3, wherein the adjusted timestamp is calculated by the server computing device.

6. The computerized method of claim 1, further comprising:
uploading, by the mobile computing device, the produced shareable video to a social network.

7. The computerized method of claim 1, wherein the video capture comprises a first video feed from a rear-facing camera of the mobile computing device and a second video feed from a front-facing camera of the mobile computing device.

8. The computerized method of claim 7, wherein the produced shareable video comprises video from the first video feed and the second video feed.

9. A mobile computing device for wireless capture of real-time audio and video at a live event, the mobile computing device configured to:
initiate a video capture corresponding to a live event at a first time;
initiate an audio capture by one or more microphones of the mobile computing device at the first time;
locally store the video capture and the audio capture, both comprising a timestamp and a duration;
transmit the timestamp and the duration to a server computing device via a wireless network;
receive an audio segment corresponding to the live event at a second time based on an adjusted timestamp and the duration, wherein the adjusted timestamp is calculated based on the timestamp and the audio capture; and
produce a shareable video corresponding to the live event based on the captured video and the audio segment.

10. The mobile computing device of claim 9, wherein the adjusted timestamp is further based on an audio travel time between a speaker device at the live event and the one or more microphones of the mobile computing device.

11. The mobile computing device of claim 9, wherein the mobile computing device is further configured to:
calculate the adjusted timestamp based on the timestamp and the audio capture.

12. The mobile computing device of claim 9, wherein the mobile computing device is further configured to:
transmit the audio capture to the server computing device via the wireless network.

13. The mobile computing device of claim 12, wherein the adjusted timestamp is calculated by the server computing device.

14. The mobile computing device of claim 9, wherein the mobile computing device is further configured to:
upload the produced shareable video to a social network.

15. The mobile computing device of claim 9, wherein the video capture comprises a first video feed from a rear-facing camera of the mobile computing device and a second video feed from a front-facing camera of the mobile computing device.

16. The mobile computing device of claim 15, wherein the produced shareable video comprises video from the first video feed and the second video feed.

17. A system for wireless capture of real-time audio and video at a live event using a mobile computing device, the system comprising:
a mobile computing device communicatively coupled to a server computing device over a wireless network, the mobile computing device configured to:
initiate a video capture corresponding to a live event at a first time;
initiate an audio capture by one or more microphones of the mobile computing device at the first time;
locally store the video capture and the audio capture, both comprising a timestamp and a duration;
transmit the timestamp and the duration to the server computing device via the wireless network;
receive an audio segment corresponding to the live event at a second time based on an adjusted timestamp and the duration, wherein the adjusted timestamp is calculated based on the timestamp and the audio capture; and
produce a shareable video corresponding to the live event based on the captured video and the audio segment.

18. The system of claim 17, wherein the mobile computing device is further configured to:
calculate the adjusted timestamp based on the timestamp and the audio capture.

19. The system of claim 17, wherein the mobile computing device is further configured to:
transmit the audio capture to the server computing device via the wireless network.

20. The system of claim 19, wherein the server computing device is configured to:
calculate the adjusted timestamp based on at least the timestamp and the audio capture.

* * * * *